C. VOLKMANN.
STRIPPER FOR COTTON PICKING SPINDLES.
APPLICATION FILED FEB. 23, 1911.
1,184,796.
Patented May 30, 1916.
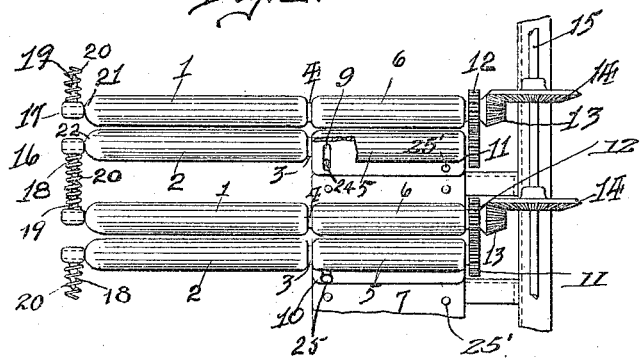
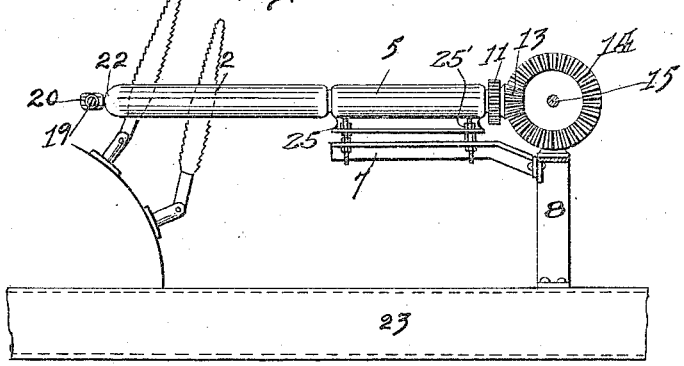

UNITED STATES PATENT OFFICE.

CHARLES VOLKMANN, OF CHICAGO, ILLINOIS.

STRIPPER FOR COTTON-PICKING SPINDLES.

1,184,796.

Specification of Letters Patent.

Patented May 30, 1916.

Application filed February 23, 1911. Serial No. 610,406.

*To all whom it may concern:*

Be it known that I, CHARLES VOLKMANN, a citizen of the United States, residing at Chicago, county of Cook, and State of Illinois, have invented a certain new and useful Improvement in Strippers for Cotton-Picking Spindles, of which the following is a specification.

My invention relates to that class of cotton pickers in which the cotton is picked by means of a rotating blade which has serrations provided upon the edges to engage the cotton projecting from the ripened bolls. In this class of pickers, the picking-blade is drawn through a pair of strippers during a period of the rotation of a drum, which is accomplished by their being drawn through the stripping-blades and the cotton is stripped from the teeth. These strippers do not always operate to clean the blade thoroughly, and my invention has for its object to provide for an improvement in stripping mechanism, which will insure the removal of all the cotton from the picking-blade, or spindle.

My means of accomplishing the foregoing may be more readily understood by having reference to the accompanying drawings which are hereunto annexed and are a part of this specification, in which:

Figure 1 is a top or plan view of a pair of strippers constructed in accordance with my improvement, only a fragmentary portion of a frame being shown, as the cotton picker, *per se*, forms no part of this invention, it being understood that my device is applicable to all cotton pickers employing a flat picking spindle or blade. Fig. 2 is a side elevation of the device shown in Fig. 1.

Similar reference numerals refer to similar parts throughout the entire description.

As shown in the drawing; my improved strippers 1 and 2 which are arranged in pairs, are shown secured to a portion of the frame 23 of the cotton picker (not shown). The rollers 1 and 2 are cylindrical in shape and are provided with shafts 3 and 4, the inner ends of which are mounted in journal bearings 5 and 6. These bearings are carried by the platform 7 secured to a standard 8, which is securely riveted to the portion 23 of the frame. The bearings 5 and 6 are pivotally held in position by means of bolts 25′ or in any other convenient manner, but the bolts 24 and 25 should be mounted in slots 9 and 10, so as to permit the rollers to spread apart in the event of a large mass of cotton being attached to one part of the blade, this arrangement permitting them to yield slightly rather than break the blade. The bolts 24 and 25 also provide for the elevation or depression of the outer ends of the strippers to permit locating them in the position in which they will most effectively operate upon the picking blade or spindle on the cotton picker. Spur gears 11 and 12 are mounted upon the ends of the shafts 3 and 4 respectively, and the teeth of these gears are in mesh with each other. The inner end of the shaft 4 extends beyond the end of the shaft 3 and has mounted thereon a bevel pinion 13, the teeth of which mesh with the teeth of the bevel gear 14, which is rigidly attached to a shaft 15, which is rotated in any desirable direction by any suitable or convenient power (not shown). The outer ends 16 and 17 of the shafts 3 and 4, respectively, extend beyond the end of the rollers 1 and 2, having mounted between them, spacing rods 18 and 19 which are secured in the outer ends 16 and 17 of the shafts 3 and 4. These spacers are surrounded by coil springs 20, the tension of which serves to cause the face of the rollers to engage each other tightly. The ends 21 and 22 of the rollers 1 and 2 are spherical in shape, thus insuring the entrance of the picking spindle under all circumstances.

The operation of the device is as follows: The shaft 15 being rotated, rotates the gears 14 which in turn rotate the pinion 13. This causes the shaft 4 to revolve, and it, through the spur gears 11 and 12 causes the shaft 3 to revolve. This motion should be arranged so as to cause the adjacent faces of the rollers to move in opposite direction from that of the picking spindle as it passes between the rollers 1 and 2, it being understood that the pairs of rollers are arranged so their point of contact will be in alinement with the picking spindles. The result is that the picking spindle will be drawn between the rollers and that the cotton which will become attached to the serrations cut upon the edges of the picking spindles is rolled off of them leaving them perfectly clean and ready to again engage the ripened cotton. It may be found desirable in practice to provide these rollers with a roughened surface which obviously can be done without deviating from the spirit of my invention. The cotton will be thrown away from the picking spindle and it can then be carried off by any convenient form of conveyer (not shown), which may be provided intermediate the pairs of strippers, whence it can be carried to any convenient receptacle.

Having described my invention, what I regard as new and desire to secure by Letters Patent, is:

1. The combination with flat picking blades of a plurality of pairs of roller strippers, the roller strippers of each pair being yieldingly held in engagement, which are axially rotated and between which said picking blades pass, the outer ends of the roller strippers being spherical in shape and means to cause the adjacent faces of the roller strippers to move in an opposite direction to that in which the blades are moving, and means to move the blades through said roller strippers.

2. The combination with a flat picking blade, of a pair of roller strippers which are axially rotated and between which the said picking blade passes, means to provide for a pressure between the roller strippers and means to cause the adjacent faces of the roller strippers to move in an opposite direction to that in which the blade is moving, and means to move the blades through said roller strippers.

3. The combination with flat picking blades, of a pair of rollers through which the picking blades pass, shafts upon which said rollers are mounted, spur gears mounted upon the shafts of said rollers, the teeth of which mesh with each other, a bevel pinion mounted upon the end of one of the shafts of said rollers, a rotating shaft, a bevel gear mounted upon said shaft, the teeth of which mesh with the bevel pinion mounted upon the end of the roller shaft and means to move the blades through said rollers.

4. The combination with flat picking blades, of a pair of roller strippers, between which the blades pass, shafts upon which strippers are mounted, spur gears mounted on the shafts of said strippers, the teeth of which mesh with each other, a bevel pinion mounted upon the end of one of the shafts of said strippers, a rotating shaft, a bevel gear mounted upon said shaft, the teeth of which mesh with the bevel pinion mounted upon the end of the stripper shaft, spring actuated means to cause a friction between the strippers of each pair and means to move the blades through said roller strippers.

5. The combination with flat picking blades, of a pair of roller strippers, between which the blades pass, shafts upon which said strippers are mounted, spur gears mounted on the shafts of said strippers, the teeth of which mesh with each other, a bevel pinion mounted upon the end of one of the shafts of said strippers, a rotating shaft, a bevel gear mounted upon said shaft, the teeth of which mesh with the bevel pinion mounted upon the end of the stripper shaft, spring actuated means to cause a pressure between the strippers of each pair, adjustable bearings in which said stripper shafts are mounted and means to move the blades through said roller strippers.

CHARLES VOLKMANN.

Witnesses:
H. S. COWAN,
C. M. BAUMEISTER.

Copies of this patent may be obtained for five cents each, by addressing the "Commissioner of Patents, Washington, D. C."